United States Patent [19]
Kubota et al.

[11] Patent Number: 4,937,416
[45] Date of Patent: Jun. 26, 1990

[54] ELECTROCONTACT DISCHARGE DRESSING METHOD FOR GRINDING WHEEL

[75] Inventors: Mamoru Kubota, Hitachi; Kinio Takahashi, Nagoya; Kenji Suzuki, Chiryu, all of Japan

[73] Assignees: Mamoru Kubota, Hitachi; Toyoda Van Moppes Limited, Okazaki, both of Japan

[21] Appl. No.: 315,156

[22] Filed: Feb. 24, 1989

[51] Int. Cl.$^5$ .............................................. B23H 5/04
[52] U.S. Cl. .............................. 219/69.17; 219/69.11; 219/76.13
[58] Field of Search ............... 219/76.13, 69.17, 69.11; 125/11 R

[56] References Cited

U.S. PATENT DOCUMENTS

| | | | |
|---|---|---|---|
| 3,670,137 | 6/1972 | Inoue | 219/76.13 |
| 3,941,970 | 3/1976 | Grow | 219/69.17 |
| 4,849,599 | 7/1989 | Kuromatsu | 219/69.17 |

OTHER PUBLICATIONS

504 Twin Electrode System Electrocontact Discharge Dressing of Diamond Grinding Wheels, Mamoru Kubota, et al.—Sep. 14, 1988.
J54 Electrocontact Discharge Dressing of Metal Bonded Super Hard Abrasive Grains Grinding Wheels, Mamoru Kubota, et al., Feb. 25, 1988.

*Primary Examiner*—Clifford C. Shaw
*Attorney, Agent, or Firm*—Cushman, Darby & Cushman

[57] ABSTRACT

An electrocontact discharge dressing for a grinding wheel is performed by contacting a grinding surface of the grinding wheel, which is formed by bonding super hard diamond grains with a metal-based bond, with a pair of electrodes made of steels for general structure, rotating the grinding wheel for grinding a contact surface of each of the pair of electrodes with the rotating grinding wheel to form flow type chips in the contact surface, and applying a voltage to the pair of electrodes to generate an electric discharge from the flow type chips toward the metal-based bond of the rotating grinding wheel whereby the metal-based bond is molten due to heat of the electric discharge, and removed from the grinding wheel to enable dressing of the grinding wheel with excellent dressing efficiency.

6 Claims, 6 Drawing Sheets

ELECTROCONTACT DISCHARGE DRESSING METHOD FOR GRINDING WHEEL

BACKGROUND OF THE INVENTION

1. Field of the Invention

The present invention relates to an electrocontact discharge dressing method for a grinding wheel provided with a grinding surface formed by bonding super hard abrasive grains with an electrically conductive bond such as a metal bond.

2. Description of the Prior art

A grinding wheel using super hard abrasive grains of diamond or cubic boron nitride has been widely employed for grinding hard materials such as advanced ceramics.

In order to improve the grinding ratio of this grinding wheel and prevent abrasive grains from releasing from the grinding wheel, and accordingly improve the economical efficiency, it is desirable to securely bond the abrasive grains with a metal bond or the like.

In order to improve the sharpness of the grinding wheel, it is required to be dressed before grinding so that the abrasive grains project from the metal bond by a predetermined amount. And for this purpose, conventionally, WA stick method using a white aluminum oxide (WA) stick has been generally used. However, this method has a problem that it is difficult to mechanically dress the metal bond super hard abrasive grain grinding wheel which uses a bond of high grade, and accordingly it takes a long dressing time so that the dressing efficiency is not good.

Another well known dressing method is an electric discharge dressing method of effecting an electric discharge between an electrode and the metal bond and melting the metal bond away from the grinding wheel due to the generated heat.

Figure 8:
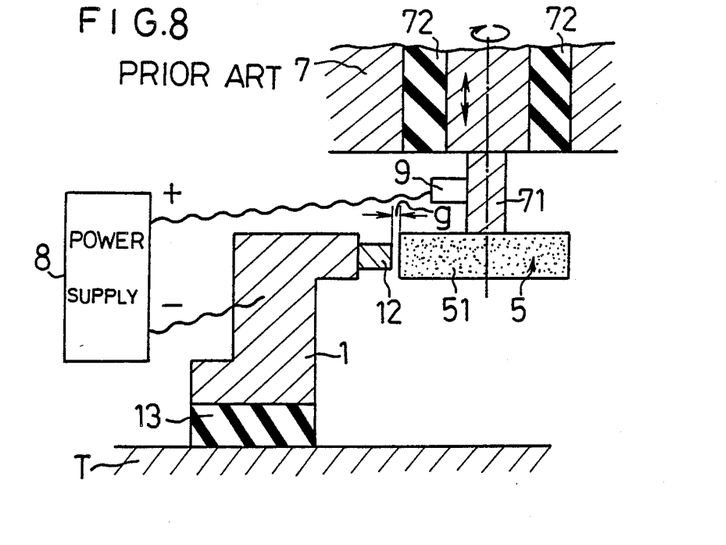
FIG. 8 is an overall cross sectional view of a conventional electric discharge dressing device.

FIG. 8 illustrates one example of the device for the electric discharge dressing method. In FIG. 8, a base body 1 made of metal, which supports at one end surface a carbon electrode 12, is mounted on a table T of a surface grinding machine 7 through an insulating body 13. To an end of a wheel spindle 71 of the surface grinding machine 7 is secured a circular plate-shaped grinding wheel 5 having a grinding surface 51 in its outer peripheral surface. The grinding surface 51 is opposed to the electrode 12 through a predetermined gap g.

The base body 1 and the wheel spindle 71 are electrically connected to a power supply 8, respectively.

When a voltage is applied, an electric discharge is effected from the electrode 12 to a metal bond of the rotating grinding wheel 5 to melt the metal bond away from the grinding wheel 5 due to heat of the electric discharge. Thus, the grinding wheel 5 is dressed.

Electric discharge dressing as described above can be adapted to any grinding wheel of which the bond has electrical conductivity, regardless of the abrasive grains bonding force. However, this method has disadvantages of requiring a high discharge voltage (normally about 100 V), and being not free from the danger of receiving electric shock. Moreover, this method requires the alterations of the grinding machine. For example, a slip ring-brush mechanism 9 must be provided in the wheel spindle 71 in order to supply an electric current thereto, and insulating bodies 72 must be provided between the wheel spindle 71 and a main body of the grinding machine 7. And the production cost to the device provided with a pulse power supply is very expensive.

Figure 9:
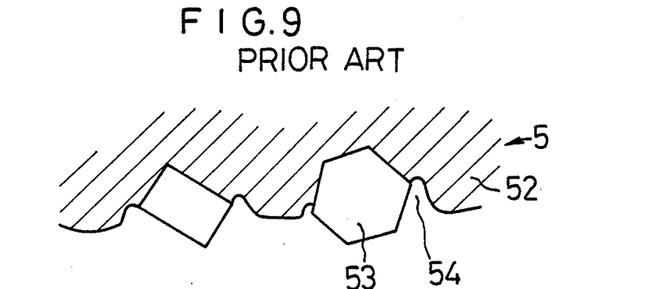
FIG. 9 is an enlarged cross sectional view of an interfacial area of a grinding wheel and an electrode in the conventional electric discharge dressing.

In addition to the above disadvantages, in the electric discharge dressing, an electric discharge tends to concentrate in the vicinity of the abrasive grains. This results in the bond 52 surrounding an abrasive grain 58 for example often excessively melting away to form a channel 54 around the abrasive grain 53 as shown in FIG. 9. The formation of channel 54 may often lower the abrasive grain retaining force.

SUMMARY OF THE INVENTION

It is an object of the present invention to provide a method for dressing a grinding wheel, which effects an electric discharge at a low voltage, does not require any alteration of the grinding machine, enables the decrease in cost, and is free from the lowering of the abrasive grain retaining force.

According to the present invention, a pair of electrodes made of such a metallic material as to form flow type chips during grinding, are used. These pair of electrodes are mechanically ground by contacting them with a rotating grinding wheel to effect an electric discharge between the flow type chips and an electrically conductive bond of the grinding wheel. This electric discharge is effected at a low voltage since the formed chips are very close to the electrically conductive bond. Therefore, the occurrence of the electric shock caused by the electric discharge can be reduced. Moreover, the electric discharge does not concentrate in the vicinity of the abrasive grains, so the abrasive grain retaining force is prevented from lowering. In addition, an electric current is not supplied to the wheel spindle so that the grinding machine need not be altered, so the production cost of the device becomes inexpensive, and the dressing operation can be facilitated.

DETAILED DESCRIPTION OF THE EMBODIMENTS

The grinding wheel to be dressed by electrocontact discharge dressing method according to the present invention is produced by bonding super hard abrasive grains of diamond, cubic boron nitride or the like with a bond. The bond for bonding the super hard abrasive grains is required to have electrical conductivity. Examples of such a bond include metal-based bonds such as bronze bond, steel bond and cast iron fiber bond, and resin bond or vitrified bond of which the electrical conductivity is increased due to the addition of electrically conductive filler such as copper powder.

Other examples of the grinding wheel include a grinding wheel formed by compacting metal-coated diamond or cubic boron nitride abrasive grains to such a high density as to contact each other and bonding them with resin bond or vitrified bond, and a grinding wheel formed by electrodeposition.

A pair of electrodes are made of such a metal as to form flow type chips during grinding. Examples of metals for the electrodes include steels for general structure, steels for pressure vessels, carbon and alloy steels for machine structural use, steels for special purposes such as stainless steels and heat-resisting steels, spring steels, free cutting steels and bearing steels, steel castings and forgings such as steel forgings, steel castings, and iron castings, non ferrous metals such as copper, aluminum, magnesium, copper alloys, aluminum alloys, magnesium alloys and castings. Particularly, steels for general structure, copper, aluminum, copper alloys and aluminum alloys are preferably used as the metal for the electrodes. In the case of carbon electrodes, not flow-type chips but powdery chips are formed so that an electric discharge does not occur in good condition.

According to the present invention, the dimensions of each electrode are not limited to specific values. Preferable dimensions are as follows.

The thickness(t) of each electrode is preferably ranged from 3 to 10 mm. The electrode of a thickness smaller than 3 mm lacks stiffness, accordingly is liable to deflect or chatter during grinding so as not to form chips uniformly. And in this case, in order to obtain a predetermined amount of dressing, which is in proportion to the ground volume of the electrode, the depth of cut in the direction of height must be increased. This results in the number of times of dressing per one set of electrodes being decreased and the life of the electrodes becoming short.

If the thickness of each electrode is made larger than 10 mm, coolant is difficult to be sprayed on the entire surface of the electrode and undesirable continuous arc discharge takes place that excessively damages the grinding wheel. In this case, if a coolant channel is provided in the longitudinal direction of each electrode, the above-described problem can be solved.

Figure 2:
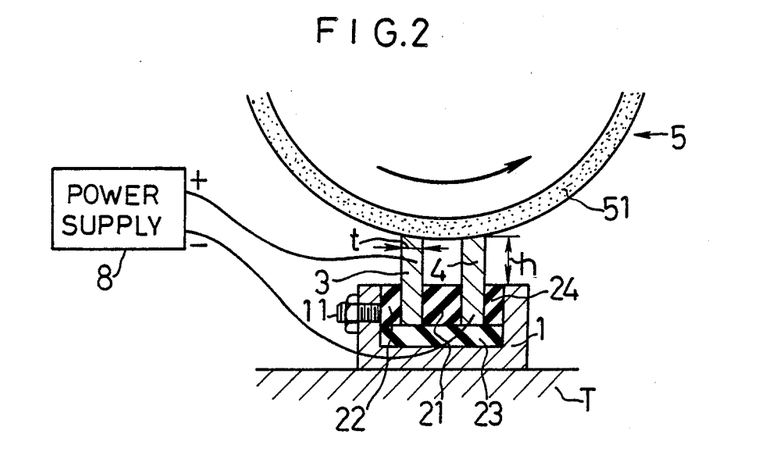
FIG. 2 is an overall cross sectional view of an electrocontact discharge dressing device used in embodiments of the present invention.

The height (h) of a projecting portion of each electrode from the base body 1 is preferably ranged from 10 to 30 mm. If the height is smaller than 10 mm, the projecting portion of the electrode is ground in a short time so that the number of times of dressing per one set of electrodes is decreased and the electrode must be exchanged for a new one in a short time.

If the height is larger than 30 mm, the stiffness of the electrode becomes low so that stable grinding becomes impossible.

The preferable length of each electrode is larger than the width of the grinding wheel. The maximum length is determined in consideration of the width of the grinding wheel and conditions of a space for the device.

As described above, the dimensions are determined in consideration of the amount of dressing, the number of times of dressing, the stiffness of the electrode and the conditions of the space for the device.

For example, the present inventors aim to provide about 0.02 $mm^3$ of a ground volume of electrode per one dressing operation in every 1 $mm^2$ of the peripheral surface of the grinding wheel to be dressed in order to obtain the amount of projection of diamond grains or cubic boron nitride grains of about 0.03 mm. And also, they aim to provide 100 or more times of dressing per one set of electrodes.

Moreover, the dimensions of the electrodes are determined in consideration of the type of the electric discharge dressing method, traverse type or plunge type as well.

The distance between the pair of electrodes are suitably selected so that each electrode comes into close contact with the grinding surface of the grinding wheel to be dressed in consideration of the dimensions of the grinding wheel. The preferable distance is normally ranged from 2 to 10 mm. When the distance is larger than 10 mm, electric discharge dressing can be performed, but the dressed condition of the outer peripheral portion of the grinding wheel is scattered and sufficiently dressed portions and insufficiently dressed portions are often observed as a striped pattern. In order to prevent the scattering in dressed condition, it is required to decrease the distance between the electrodes so as not to generate continuous arc discharge, or adjust the above-described distance so that the circumferential length is not equal to a multiple of the above-described distance.

Figure 1:
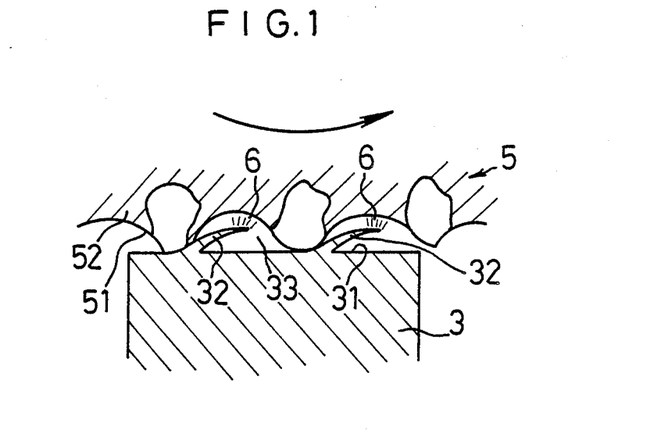
FIG. 1 is an enlarged cross sectional view of an interfacial area of the grinding wheel and an electrode, which illustrates an idea of electrocontact discharge dressing of the present invention.

When the electrocontact discharge dressing is performed, as shown in FIG. 1, a pair of electrodes (only an electrode 3 is shown in the drawing) are disposed in contact with a grinding surface 51 of a grinding wheel 5. Then, the grinding wheel 5 is rotated to grind a contact surface 31 of the electrode 3, thereby forming flow type chips 32 therein. At the same time with grinding, a voltage is applied to the electrode 3. This results in electric 6 taking place directly before or after the flow type chips 32 come into contact with an electrically conductive bond 52 of the rotating grinding wheel 8. The electric discharges 6 cause the bond 52 facing to the chips 32 to be molten and evaporated to form chip pockets 33.

Because the chips 32 are close to the bond 52, a low voltage is good enough to effect electric discharges therebetween. Normally, the voltage to be applied to the electrode 3 is suitably selected from the range of 40 to 60 V.

A power supply may be either DC or AC power supply. But in the case of AC power supply, the electric discharge occurs only in the vicinity of the positive and negative peak of voltage, so the DC power supply is more sufficiently used as compared with the AC power supply.

The electrodes may be fed toward the center of the grinding wheel at low speed. But normally, the electrodes are brought into a close contact with the grinding wheel, respectively, and are fed in a lengthwise direction of the electrodes. This feeding method facilitates the grinding work. In this case, as the depth of cut or the feeding speed is increased, the resulting electric discharge becomes more violent.

The amount of dressing is in proportion to the volume of chips ground by the grinding wheel, which is equal to the ground volume of each electrode. Therefore, by increasing the feeding distance, the depth of cut per one dressing operation can be decreased to reduce the consumption of the electrodes.

During dressing, coolant must be sufficiently sprayed from both sides of the electrodes to prevent the dressing temperature from excessively rising. In case that heat radiation of the electrodes is insufficient, the electrode temperature rises to generate arc discharge thereby causing the electrically conductive bond to melt excessively.

Hereinafter, we will explain the details of the present invention based on several examples.

Example 1

Following experiment was conducted to a grinding wheel provided with a grinding surface formed by bonding diamond abrasive grains with a bronze bond.

The grinding wheel used in this experiment is a bronze bond diamond grinding wheel of 205 mm in diameter, 10 mm in width, 120 μm in average diameter of the diamond grains, P in grade of the bond, and 100 (JIS) in concentration. This bronze bond diamond grinding wheel is mounted on a surface grinding machine (PSG-5 type made by Okamoto machine SS). This grinding wheel was used to cut grooves in ceramics until the cutting property thereof becomes bad, and then was subjected to the eleotrocontact discharge dressing.

FIG. 2 illustrates the electrocontact discharge dressing device used in the present example. In this drawing, a box-shaped metallic base body 1 is mounted on a magnet table T of the surface grinding machine. Within the base body 1 are disposed a pair of electrodes 3 and 4 in parallel with each other, and an insulating plate 21 made of bakelite is interposed between the electrodes 3 and 4. The electrodes s and 4 are respectively composed of an aluminum plate of 3.5 mm in thickness (t), 27 mm in height (h) and 50 mm in length, and are spaced from each other by a gap of 10 mm. In this case, the height of the projecting portion of each electrode is 15 mm.

Insulating plates 22, 23 and 24 are disposed for insulating the electrodes 3 and 4 from the base body 1. These insulating plates 22, 23 and 24 are secured by a bolt 11 from the outside of the insulating plate 22. And these electrodes 3 and 4 are electrically connected to a power supply 8.

The diamond grinding wheel 5 is disposed above the electrodes 3 and 4, and is rotatably supported by the surface grinding machine (not shown). The grinding wheel 5 has a shape like a circular plate, and the outer peripheral surface of a metallic base plate acts as a grinding surface 51.

In the experiment, the diamond grinding wheel 5 was disposed so that the grinding surface 51 was in contact with the pair of electrodes 3 and 4 as shown in FIG. 2, and was subjected to electrocontact discharge dressing for a predetermined time under the conditions of 40 V in DC voltage, 32 m/s in peripheral velocity of grinding wheel, 20 μm/pass in depth of cut, and 1.2 m/min in cross feed speed. During dressing. coolant of emulsion type was sprayed.

Then, by using the thus dressed diamond grinding wheel, grooves were cut in alumina ceramics under the conditions of 5 mm in depth of cut, and 0.1 m/min in longitudinal feed speed. The relation between the dressing time and the grinding resistance is shown in FIG. 3.

Figure 3:
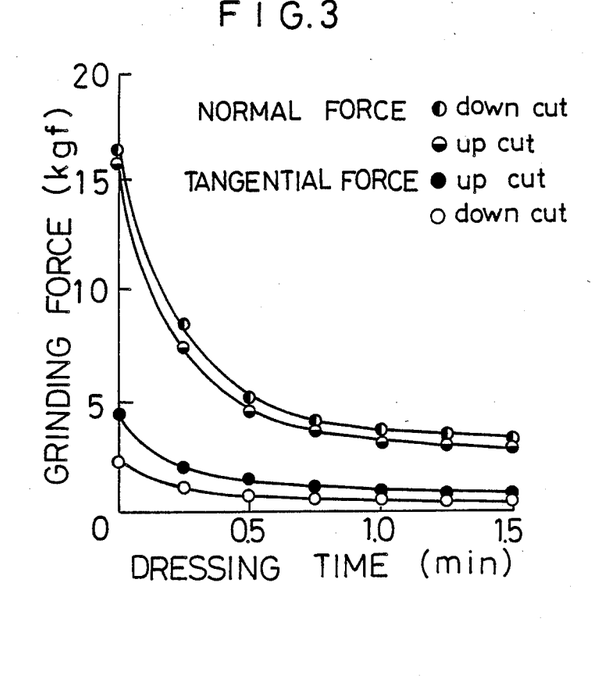
FIGS. 3 and 4 are graphs respectively showing the relation between the dressing time and the grinding resistance.

As is apparent from FIG. 3, due to the dressing for 0.5 min. the grinding resistance is decreased to one third of that prior to dressing. This result shows remarkable dressing effect. In case of 55 V in voltage, similar dressing effect can be observed by dressing for only 10 s.

Example 2

A similar experiment to that of Example 1 was conducted under conditions similar to those of Example 1 except for the material and dimensions of each electrode. Namely, the electrodes respectively composed of a copper plate of 1.0 mm in thickness, 27 mm in height and 100 mm in length, were used.

Figure 4:
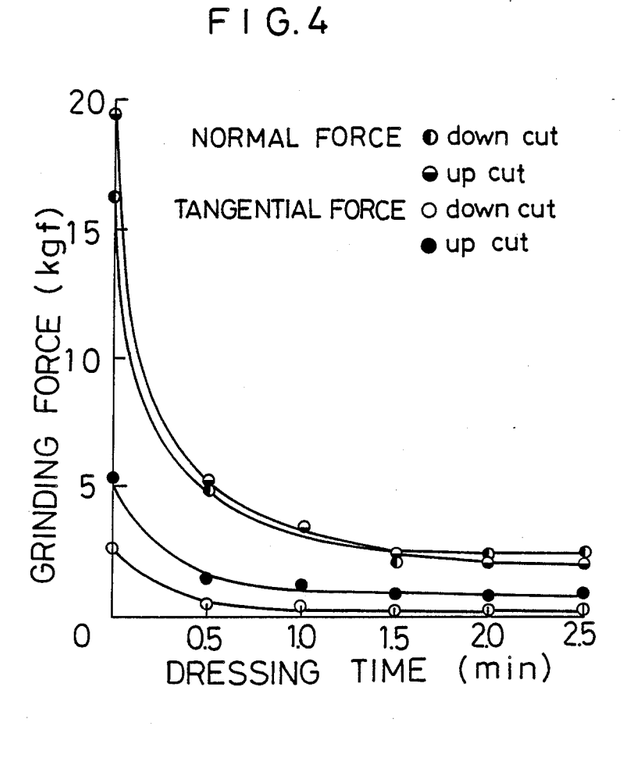

The relation of the dressing time and the grinding resistance is shown in FIG. 4. As is apparent from FIG. 4, due to dressing for 1.0 min. the grinding resistance is decreased to one fifth of that prior to dressing. This result shows that the copper electrodes also exhibits good operation effect.

Example 3

The diamond grinding wheel was subjected to electrocontact discharge dressing in a similar method to that of Example 1, and the waveform of the voltage between electrodes was examined. The obtained waveform is shown in FIG. 5.

Figure 6:
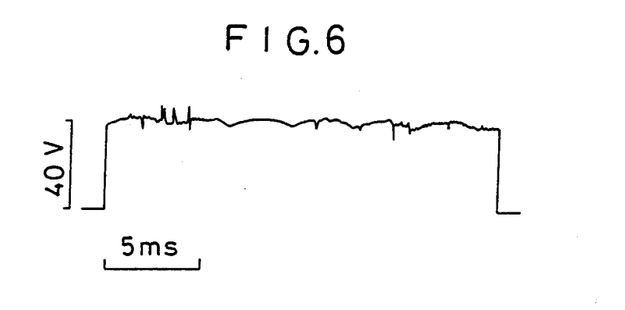
FIG. 6 is a waveform chart of a voltage between the electrodes made of carbon.

And the waveform in case of carbon electrodes of 4.5 mm in thickness. 27 mm in height, and 50 mm in length was also examined similarly for comparison. The obtained waveform is shown in FIG. 6.

Figure 5:
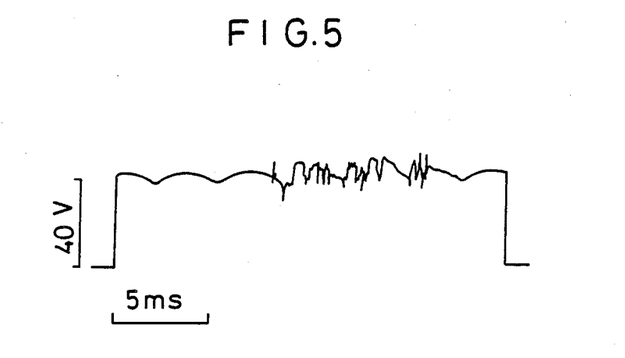
FIG. 5 is a waveform chart of a voltage between the electrodes made of aluminum.

FIG. 5 clearly shows the occurrence of an electric discharge in the aluminum electrodes. In contrast, as is apparent from FIG. 6, no voltage drop was observed in the carbon electrodes, namely electric discharges were scarcely generated therein. These results were also confirmed by the fact that sparks were observed in case of aluminum electrodes, in contrast, sparks were scarcely observed in case of carbon electrodes.

This difference in examination result between aluminum and carbon is considered to be resulted from the difference in shape of chips formed due to grinding between aluminum and carbon, which are different from each other in plasticity. Namely, aluminum has large plasticity so as to form flow type chips. These flow type aluminum chips generate electrocontact discharges against the opposed bond. In contrast, carbon has small plasticity so as to form powdery chips. These powdery carbon chips do not generate electrocontact discharges against the opposed bond. The above results show that the shape of chips is an important factors in the electrocontact discharge dressing.

Example 4

Electrodes were made of steel for general structure (ASTM D), respectively, and a grinding wheel provided with a grinding surface formed by bonding cubic boron nitride abrasive grains with a bronze bond was subjected to the electrocontact discharge dressing in a similar method to that of Example 1.

Each electrode is 3 mm in thickness, 27 mm in height and 60 mm in length. The height of the projecting portion of each electrode is 15 mm. The grinding wheel is 175 mm in diameter, 6.5 mm in width, 107 μm in average diameter of abrasive grains, K in grade of bond, and 75(JIS) in concentration. Kuroda's creepfeeld surface grinding machine (GS-BMHtype) was used as the grinding machine.

Dressing was performed under the conditions of 40 V in DC voltage, 10 μm/pass in depth of cut, 630 mm/min in cross feed speed, and 33 m/s (3600 rpm) in peripheral velocity of grinding wheel. During dressing, these electrodes were cooled by coolant (chemical solution type, having a dilution ratio of 50). Then, the relation between the number of times of cutting of electrodes(the ground volume of electrode per unit width of grinding wheel) and the amount of projection of abrasive grain was examined. Similar experiment was also conducted to the electrodes made of copper alloy (ASTM C2800). The examination results are shown in FIG. 7.

Figure 7:
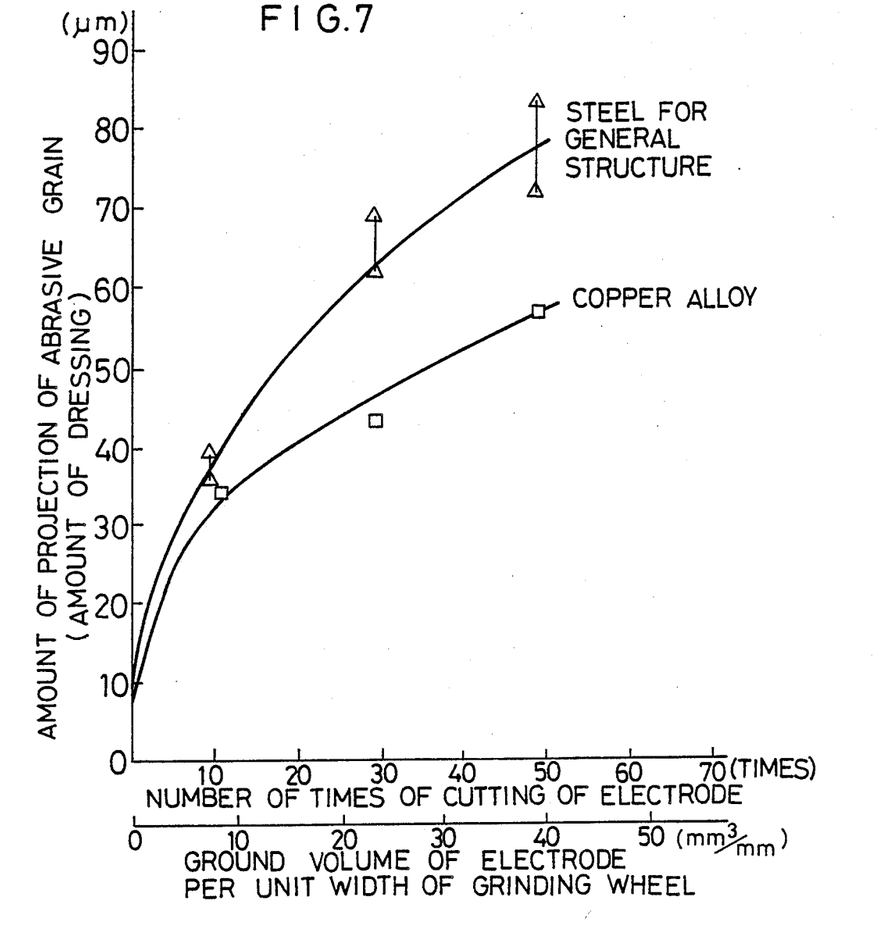
FIG. 7 is a graph showing the relation between the material of the electrodes and the electrocontact discharge dressing efficiency.

As is apparent from FIG. 7, in both cases of the electrodes made of steel for general structure and copper alloy, dressing was performed with good results. A desired amount of projection of abrasive grain of 30 μm can be obtained by only about 10 times of cutting of the electrodes.

As shown in FIG. 7, the amount of projection of abrasive grains increases with an increase in the number of times of cutting of electrodes, or in other words the ground volume of electrode per unit width of grinding wheel. This result shows that the amount of projection of abrasive grains can be easily adjusted by adjusting the number of times of cutting of the electrodes.

As is apparent from the preceding embodiments, the electrocontact discharge dressing method according to the present invention can generate an electric discharge with a low voltage, accordingly is a method of improved safety. In addition, the method according to the present invention exhibits excellent dressing efficiency, can reduce the dressing time to, for example, one half of that of WA stick method, and can easily adjust the amount of projection of abrasive grains.

What is claimed is:

1. An electrocontact discharge dressing method for a grinding wheel comprising the steps of:
    contacting a grinding surface of the grinding wheel, which is formed by bonding super hard abrasive grains with an electrically conductive bond, with a pair of electrodes made of such a metallic material as to form a flow type chip due to grinding;
    rotating the grinding wheel and grinding a contact surface of each of said pair of electrodes with said rotating grinding wheel to form said flow type chip in said contact surface:
    applying a voltage to said pair of electrodes to generate an electric discharge from said flow type chip toward said electrically conductive bond of said rotating grinding wheel whereby said electrically conductive bond is molten due to heat of said electric discharge and removed from said grinding wheel.

2. An electrocontact discharge dressing method according to claim 1, wherein said super hard abrasive grains are made of one of diamond and cubic boron nitride.

3. An electrocontact discharge dressing method according to claim 1, wherein said pair of electrodes are made of one of steels for general structure, copper, aluminum, copper alloys and aluminum alloys.

4. An electrocontact discharge dressing method according to claim 1, wherein said electrically conductive bond is made of one of metal-based bond, electrically conductive resin bond and electrically conductive vitrified bond.

5. An electrocontact discharge dressing method according to claim 1, wherein said voltage applied to said pair of electrodes is ranged from 40 to 60 V.

6. An electrocontact discharge dressing method according to claim 1, wherein said pair of electrodes are spaced from each other by a gap ranged from 2 to 10 mm.

* * * * *